Aug. 28, 1962

P. P. DIRLIK 3,051,249

MOTION TRANSFORMING APPARATUS

Filed Dec. 23, 1959

INVENTOR
PAUL P. DIRLIK

BY *Robert B. Buckley*

ATTORNEY

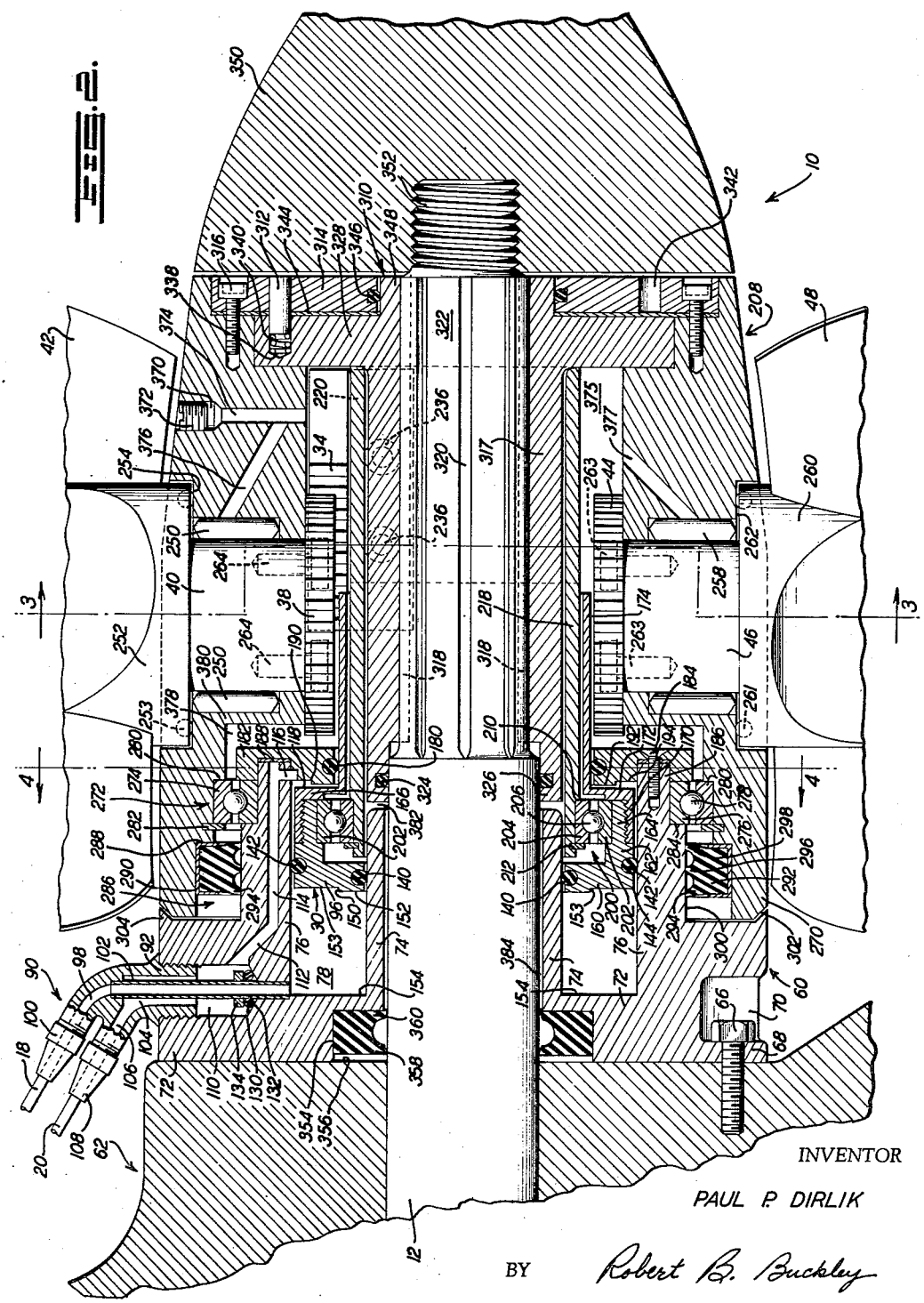

Aug. 28, 1962 P. P. DIRLIK 3,051,249
MOTION TRANSFORMING APPARATUS
Filed Dec. 23, 1959 3 Sheets-Sheet 3
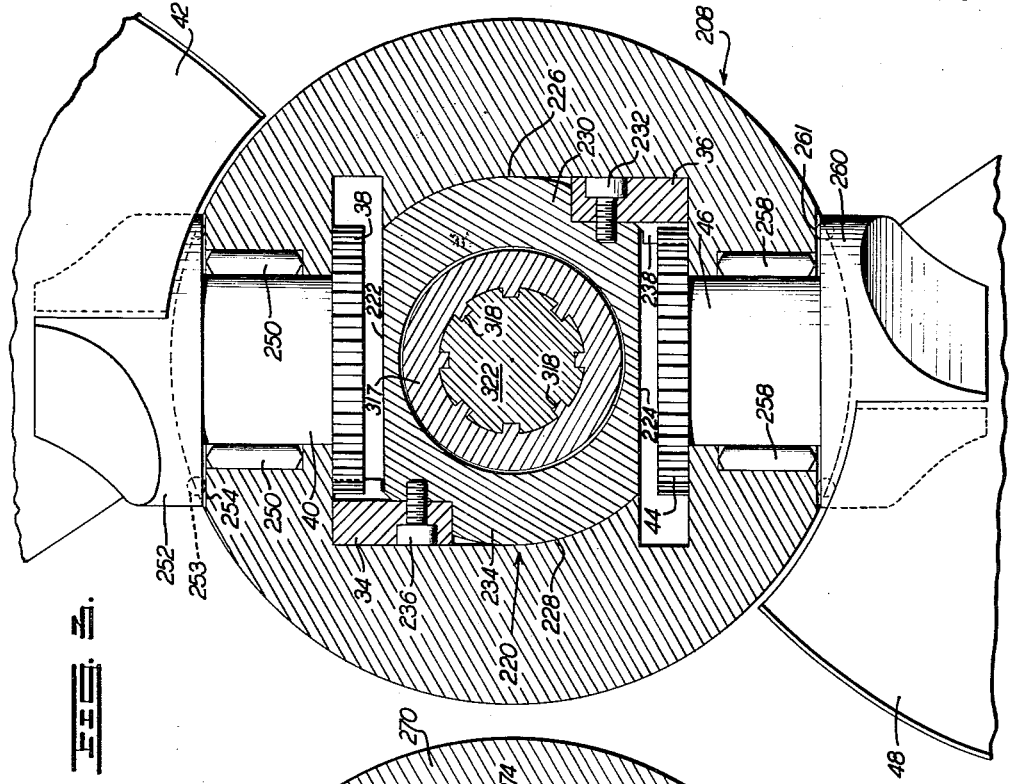
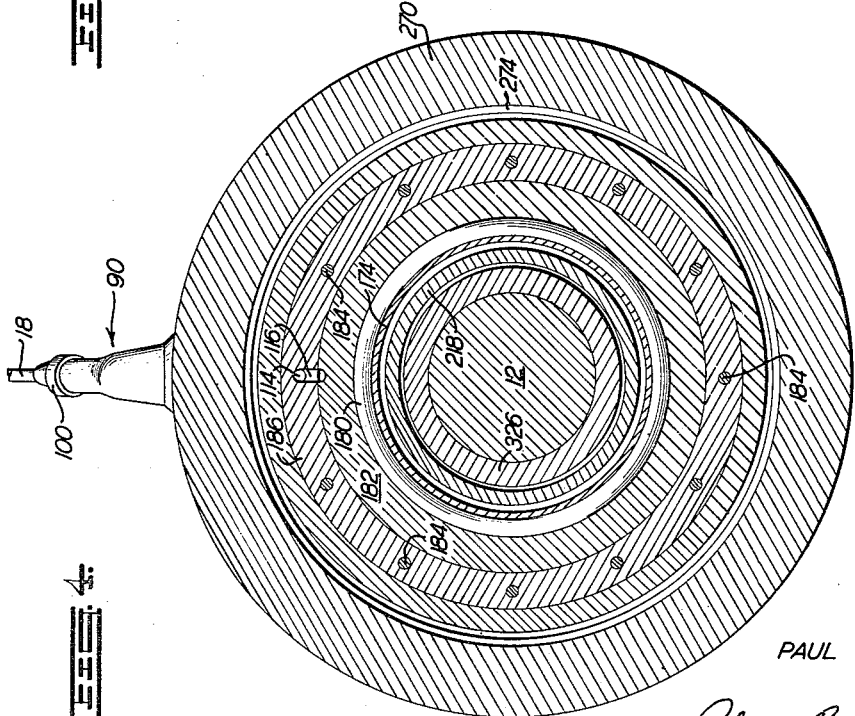
INVENTOR
PAUL P. DIRLIK
BY *Robert B. Buckley*
ATTORNEY United States Patent Office 3,051,249
Patented Aug. 28, 1962

3,051,249
MOTION TRANSFORMING APPARATUS
Paul P. Dirlik, 4847B S. 28th St., Arlington 6, Va.
Filed Dec. 23, 1959, Ser. No. 861,638
14 Claims. (Cl. 170—160.32)

This invention relates to the transmission of mechanical power. More particularly, the invention relates to apparatus for transforming reciprocatory motion to motion that is both rotational and reciprocatory with a minimum of friction and reduced wear on parts. The invention includes a controllable pitch propeller and other devices embodying the mechanical movement of the invention.

Previously, various mechanical movements have been proposed for converting reciprocating motion into motion that is both reciprocating and rotating. Many such devices have involved mechanisms subject to friction causing wear to parts requiring replacement. It is an object of the present invention to provide apparatus for converting or transforming reciprocatory motion to motion that is both reciprocatory and rotational with a minimum of friction.

The motion transforming apparatus of the invention is fluid actuated and can be employed for various uses where a rectilinear movement is to be imposed upon a member rotating with respect to a control element. Among the uses of the motion transforming apparatus of the invention are: controllable pitch propellers, rotating chucks in lathes, engaging and disengaging rotating clutches, and the like.

The invention also includes a controllable pitch propeller embodying the motion transforming apparatus according to the invention.

Heretofore, various forms of controllable pitch propellers have been proposed. The prior devices have been employed in marine vessels and in aircraft. In marine vessels, controllable pitch propellers provide various advantages.

For example, where a marine vessel has an outboard motor, a controllable pitch propeller facilitates maneuvering in restricted waters, such as coming alongside or leaving a pier, or maneuvering in narrow channels. For stopping the vessel, as where collision is imminent, the pitch of the propeller can be reversed quickly while maintaining engine speed so as to apply power promptly to stop the vessel's movement through the water.

Also, where irreversible mechanisms, such as steam turbines are employed, the full available power of the ahead turbine can be applied for stopping and reversing the motion of the vessel by rotating the propeller blades to reverse pitch. At reduced loads, the steam turbine efficiency can be improved somewhat by reducing the propeller pitch to maintain the turbine revolutions at a higher value.

Further, essentially constant-torque engines, such as the diesel engine, suffer appreciable reduction in available power when the revolutions per minute are reduced as a result of increased propeller loading during towing or trawling operations. Through the use of controllable pitch propellers, a reduction in pitch can be made when towing so that full designed power can be developed under all conditions of loading.

Also, for vessels which cruise considerably at reduced power and speed, some fuel savings can be effected by increasing the pitch above that for the design condition. The pitch increase and lower revolutions while cruising increase the engine mean effective pressure to a more economical operating condition.

The controllable pitch propeller has the advantage of providing greater combined turbine and propulsion efficiency at part load by virtue of employing a reduction in pitch with a resultant higher more efficient speed of the prime mover.

Thus, controllable pitch propellers give a vessel the ability to stop and maneuver quickly in a minimum distance and permit the maximum use of the power of the prime mover and also provide for fuel economy.

The present invention provides a controllable pitch propeller constructed for minimum wearing of parts and, thus, increased durability. The propeller of the invention can be attached to some existing outboard marine motors. By attaching the relatively inexpensive controllable pitch propeller to an outboard motor, the foregoing advantages of the controllable pitch propeller are thus economically provided for the outboard motor.

The controllable pitch propeller of the invention is constructed with a shear pin which will fail when the blades strike an obstruction, such as a submerged rock, to prevent damage to the mechanism. The propeller is constructed so that another shear pin can be readily placed in position to drive the propeller.

A further advantage of the invention is that the controllable pitch propeller is constructed with a plurality of seals for maintaining watertight integrity of the propeller and thus prevent corrosion of the parts.

A further object of the invention is to provide a controllable pitch propeller having a lubrication system with passageways for supplying lubricant to the bearings and seals of the propeller from a single lubricant inlet.

For a better understanding of the invention and its other objects, advantages and details, reference is now made to the present preferred embodiment of the invention which is shown, for the purpose of illustration only, in the attached drawings.

In the drawings:

FIG. 3 is a vertical section taken along the line 3—3 in FIG. 2;

FIG. 4 is a vertical section taken along the line 4—4 in FIG. 2 but omitting the propeller blades; and, FIG. 5 is a perspective view of the actuator which is an element of the mechanism for changing the pitch of the propeller blades and is illustrated in FIGS. 2 to 4.

Briefly stated, the invention includes a motion transforming device comprising a piston positioned in a fluid chamber. The piston is slidably reciprocable along the length of the chamber and rotatable around the axis of the chamber. Fluid, such as hydraulic oil, is delivered to the chamber for moving the piston in a reciprocatory path. An actuator is connected to a rotating element for rotation therewith. The actuator is also connected to the piston by an anti-friction bearing assembly, such as a thrust ball bearing assembly. Thus the actuator reciprocates in unison with the piston while rotating relative thereto.

The invention further includes a controllable pitch propeller having a hub revolvable on a drive shaft and having a plurality of propeller blades rotatably mounted therein and extending outwardly from the hub. A non-revolvable closure block for attachment to the vessel or engine housing extends across the inboard end of the hub and has a fluid chamber formed therein with a fluid piston reciprocably and rotatably positioned in the chamber. Passages are provided in the closure block for transmitting fluid under pressure to opposite ends of the fluid piston. An actuator reciprocates in unison with the fluid piston; but revolves relative to the piston in unison with the hub.

The actuator is connected to the propeller blades so that the reciprocation of the actuator causes rotation of each propeller blade about its axis with resultant change in the pitch of the blade. A lubricant inlet is formed in the hub for delivering lubricant through passages to the bearings and the seals provided for watertightness.

To protect the elements of the mechanism from damage when a propeller blade strikes an obstruction in the water, a frangible shear pin is provided in the driving connection between the drive shaft and the hub.

Figure 1:
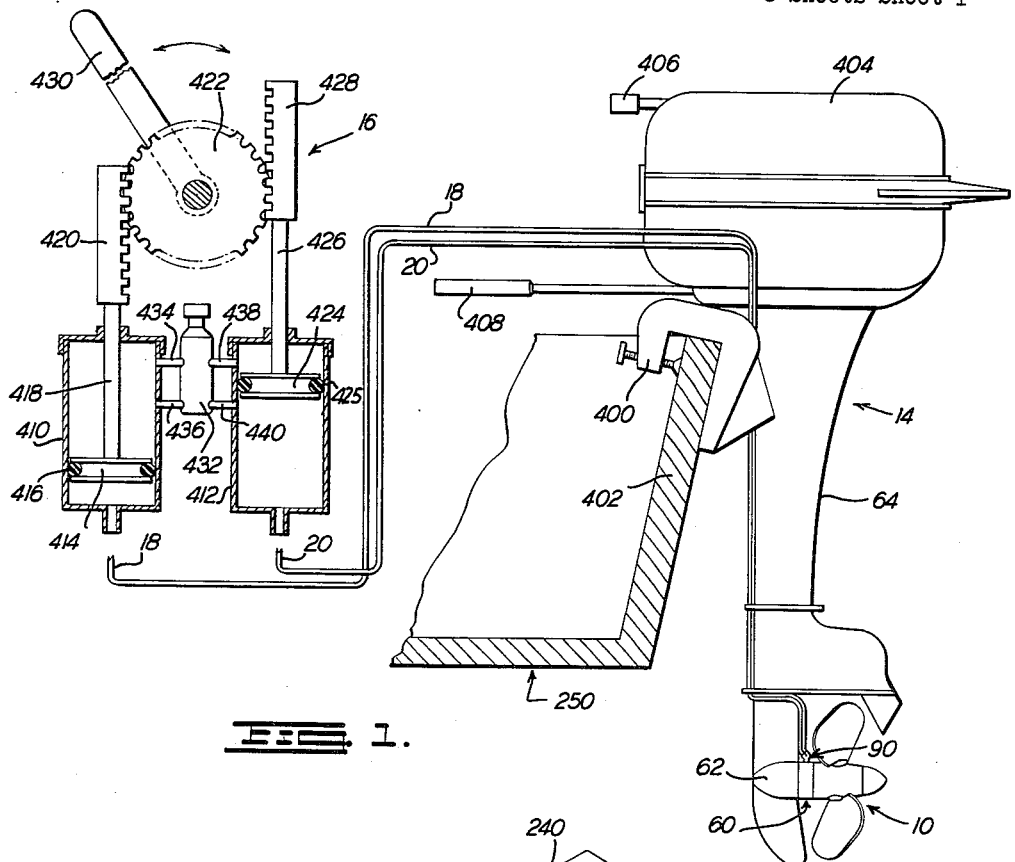
FIG. 1 is an elevation view of an outboard marine motor attached to the stern of a boat and having a controllable pitch propeller according to the invention attached thereto and actuated by a hydraulic system indicated diagrammatically at the left portion of the figure.

Referring to the drawings, the controllable pitch propeller 10 is secured on the drive shaft 12 of an outboard motor 14. A hydraulic control or supply system 16, seen in FIG. 1, is connected by hydraulic lines 18 and 20 to the propeller 10 for supplying oil under pressure to move the hydraulic piston 30 in a reciprocating manner. The actuator 32, seen in perspective in FIG. 5, reciprocates in unison with the hydraulic piston 30 but rotates relative to the piston. The actuator 32 includes a rack 34 and a rack 36. Rack 34 engages pinion 38 secured to the shank 40 of rotatably-adjustable propeller blade 42. Similarly, the rack 36 engages pinion 44 secured to the shank 46 of rotatably-adjustable propeller blade 48.

The blades 42 and 48 are contoured and configured so that the water exerts substantially zero net torque on the pinions 38 and 44. Thus, the water will not tend to change the pitch of the blades.

Figure 2:
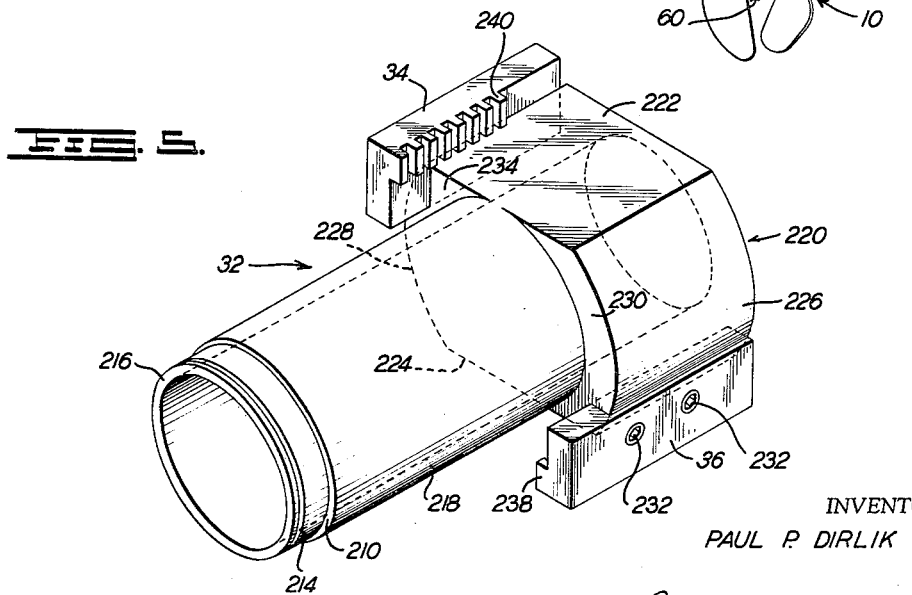
FIG. 2 is a vertical longitudinal section through the controllable pitch propeller shown attached to the outboard motor of FIG. 1.

To provide for guiding the hydraulic piston 30 and supplying oil under pressure thereto, a closure block or hydraulic control member 60 is secured to the skeg portion 62 extending downwardly from the engine housing 64. A bolt 66 is shown in FIG. 2 for connecting the closure member 60 to the skeg unit 62 by engagement with a flange 68. A cavity 70 is formed in the closure member 60 for receiving the head of bolt 66. The closure member 60 includes an annular plate portion 72. An inner cylindrical flange 74 and an outer cylindrical flange 76 extend from the plate portion 72. The flanges 74 and 76 form an annular space or fluid chamber 78 therebetween receiving the annular hydraulic piston 30. The inner flange 74 defines a bore through which the drive shaft 12 extends.

For reciprocating piston 30, oil under pressure is supplied to the opposite sides of hydraulic piston 30 through a fitting 90 having a threaded shank 92 engaging a threaded opening in the closure plate 72. The oil is supplied to the inboard portion 96 of hydraulic piston 30 from hydraulic line 18 connected to a duct 98 formed in upper branch 100 of fitting 90. The oil passes from duct 98 through a pipe 102 extending downwardly through the center of a bore 104 formed in the fitting 90. The pipe 102 extends down through an aperture in closure plate 72 and opens into the inboard portion of annular space 78.

For actuating the hydraulic piston 30 in the opposite direction, that is, toward skeg 62, oil is supplied through line 20, duct 106 formed in lower branch 108 of fitting 90, bore 104 communicating with duct 106, opening 110 formed in closure plate 72, oblique duct 112 formed in closure plate 72, longitudinal duct 114 formed in outer annular flange 76, and radial duct 116 communicating with the outboard end of longitudinal duct 114. The radial duct 116 extends through the diminished outboard end of the outer annular flange 76 and opens into the outboard portion of annular space 78 to supply hydraulic pressure against the outboard face 118 of hydraulic piston 30.

To seal the above-described oil passages from each other, a seal ring 130 is pressed into sealing engagement with the frusto-conical lower surface 132 of opening 110 and with the outer surface of pipe 102. An annular plate 134 is secured to the pipe 102 for pressing the sealing ring 130 into fluid-tight sealing engagement with the surfaces.

To provide for sealing the hydraulic piston 30 within the annular space 78, an inner O-ring seal 140 is positioned in inboard piston portion 96 and engages the outer surface of inner flange 74. Similarly, an outer O-ring seal 142 is mounted in the outer surface 144 of inboard piston portion 96 and engages the inner surface of outer flange 76.

The inboard piston portion 96 has a shoulder 150 to form a wall portion 152 offset from wall portion 153. The wall portion 152 will engage the inboard end wall 154 at the end of annular space 78 at the end of the inward stroke of piston 30. A cavity will thus be formed between the end wall 154 and the offset wall portion 153 for receiving oil under pressure from pipe 102 for initiating the outward stroke of piston 30. A locking of piston 30 in the inboard position is thus prevented.

The hydraulic piston 30 has a generally annular shape. The inboard piston portion 96 includes a radial part 160 and a cylindrical flange part 162 extending therefrom and having a diminished end 164 threadedly engaging outboard piston portion 166 having an annular external shape and a generally L-shaped cross section. The outboard piston portion 166 includes an outer cylindrical part 170, a radial connecting part 172 and an inner cylindrical sleeve part 174.

To provide for sealing the hydraulic oil in the outboard portion of annular space 78, an O-ring seal 180 engages the outer surface of sleeve part 174 and is positioned in a groove formed in the inner surface of an annular plate 182 secured by a plurality of circumferentially-spaced bolts 184 to the diminished end 186 of outer flange 76. The diminished end 186 is received in a mating annular slot formed in the plate 182. A gasket 188 is positioned between the diminished flange end 186 and the plate 182.

The inboard surface of plate 182 has a shoulder 190 forming a surface portion 192 offset from surface portion 194. Thus, a cavity is formed between the offset surface portion 194 of the plate 182 and the radial part 172 for receiving oil under pressure from duct 116 to initiate the inward stroke of piston 30. A locking of the piston 30 in the outboard position is thus prevented.

As subsequently described, the actuator 32 is so dimensioned as to prevent the piston surface 118 from touching the plate surface portion 192, thus preventing strain of plate 182 and the leaking which might result therefrom.

The hydraulic piston 30 drives the actuator 32 through the thrust ball bearing assembly 200 comprising an outer race 202 secured to the piston 30, an inner race 204 secured to the actuator 32, and a plurality of balls 206 rolling in grooves formed in the races 202 and 204. The ball bearing assembly 200 reduces friction between the reciprocating but usually non-revolving piston 30 and the both reciprocating and revolving actuator 32. It will be seen that the actuator 32 revolves with the hub 208 and the blades 42 and 48. It will also be seen that piston 30 can revolve if the bearing assembly 200 should become jammed or frozen.

The outer bearing race 202 is positioned in a slot formed in the piston flange part 162 and grippingly held in place by the radial piston part 172. The inner race 204 is held in position against an actuator shoulder 210 by a snap ring 212 received in a slot 214 formed in the diminished cylindrical end 216 of actuator 32, as seen in FIGS. 2 and 5.

With continuing reference to FIGS. 2 and 5, the actuator 32 also includes a middle circular-cylindrical portion 218 and an enlarged rack-receiving portion 220 having its surfaces formed for mating engagement with a bore formed in hub 208. The rack receiving portion 220 has two opposed flat surfaces 222 and 224 and two curved surfaces 226 and 228.

Referring to FIGS. 3 and 5, a side extension 230 of actuator portion 220 has a slot formed therein which receives the rack 36. A pair of bolts 232 secure the rack 36 to the extension 230.

Similarly, the side extension 234 has a slot formed therein receiving the rack 34. A pair of bolts 236 secure the rack 34 to the extension 234.

The teeth 238 of rack 36 engage the teeth of pinion 44 to produce rotation of blade 48 about its axis to change the pitch thereof. Similarly, the teeth 240 of rack 34 engage pinion 38 for producing rotation of blade 42 about its axis to change the pitch thereof. In FIGS. 1, 2 and 3, the blades 42 and 48 are shown at maximum ahead pitch for propelling the boat 250 forwardly through the water. By rotation of the blades 42 and 48 about their axes, the pitch of the blades can be varied to maximum reverse pitch, neutral and various intermediate pitches.

The shank 40 of blade 42 is journaled in an aperture extending through hub 208. A plurality of roller or needle bearings 250 are positioned in a slot formed in the hub 208 and engage the shank 40. The shank 40 extends from a butt 252 having an O-ring seal 253 positioned in its lower surface and forming a sealing engagement with an annular surface 254 of a slot formed in the hub 208.

In similar fashion, the opposite propeller shank 46 is received in an aperture formed in the hub 208 and is supported by roller bearings 258 engaging the shank 46 and received in an offset formed in the hub 208. The butt 260 of blade 48 is received in a slot formed in hub 208 and has an O-ring seal 261 positioned in a slot formed in its inner surface and engaging the surface 262 of said offset. Bolts 263 secure the pinion 44 to the shank 46. Similarly, bolts 264 secure the pinion 38 to the shank 40.

The hub 208 has its inboard end 270 of diminished thickness supported upon closure flange 76 by a ball bearing assembly 272 including an outer race 274, an inner race 276 and a plurality of balls 278 rollably received in grooves formed in the races. The outer race 274 is held against a shoulder 280 by a snap ring 282 positioned in a slot in the hub end 270. The inner race 276 is held against the shoulder 284 by the plate 182.

For the purpose of watertightness, a seal 286 is positioned against shoulder 288 formed in hub end 270. The seal 286 includes a retainer 290 of generally annular shape and a U-shaped cross section. A flexible ring 292 is received in the retainer 290 and has three projections 294, 296, and 298 slidingly and sealingly engaging the outer surface 300 of outer closure flange 76.

For the purpose of preventing entry of dirt, stones, weeds, and other extraneous matter between the hub end 270 and the closure plate 60, the inboard hub end 270 has a beveled corner 302 and the closure plate 60 is provided with a beveled extension 304 extending adjacent the corner 302.

The hub 208, with the blades 42 and 48, is revolved for propelling the boat 250 by power transmitted from the rotating drive shaft 12 through hub carrier 310, frangible shear pin 312, drive connector plate 314, and a plurality of circumferentially-spaced bolts 316 releasably connecting the drive connector plate 314 to the hub 208.

The hub carrier 310 has a plurality of splines 318 extending from its cylindrical middle portion 317 into the central bore of the hub carrier and engaging mating grooves 320 formed in diminished end 322 of drive shaft 12. Other connections, such as a key and keyway, can be employed for connecting the shaft 12 to the hub carrier 310. A watertight seal is formed by an O-ring seal 324 positioned in a slot formed in the cylindrical end portion 326 of hub carrier 310 and engaging the outer surface of drive shaft 12. The hub carrier 310 includes a disk-shaped flange 328 extending outwardly from the outboard end of cylindrical middle portion 317.

Referring to FIGS. 2 and 5, the actuator 32 is constructed of sufficient length so that the end 220 engages the surface of flange 328 before the piston surface 118 engages the plate 182. Thus the stressing of plate 182 by the piston 30 is prevented.

The shear pin 312 forms a driving connection between hub carrier 310 and drive connector plate 314 and is constructed of material having shearing strength so that it will fail in shear when one of the blades 42 or 48 strikes an obstruction. The shear pin 312 has one end positioned in a cavity 338 in hub carrier flange 328 and the opposite end positioned in a hole in drive connector plate 314. A compression coil spring 340 is positioned in the cavity 338 behind pin 312 to eject the fractured portion of pin 312 from the cavity subsequent to fracture. A plurality of spare holes 342 (only one of which is shown in the drawing) are formed at circumferentially-spaced positions in connector plate 314. After the fracture of pin 312 when the propeller blades 42 and 48 strike an obstruction, a portion of the pin will be jammed in the hole in connector plate 314. It will not be necessary to dislodge the fractured piece from the aperture. Rather, the plate 314, then freely rotating with respect to hub carrier 310, is rotated to align one of the spare holes 342 with the cavity 338, and a new shear pin inserted in the registering holes.

A gasket 344 between connector plate 314 and flange 328 aids in providing watertight integrity. The gasket 344 also serves as an anti-friction device when pin 312 fails in shear, as when one of the propeller blades strikes a rock, and the hub carrier flange 328 revolves with drive shaft 12 while the drive connector plate 314 does not revolve. The gasket 344 prevents damage to the relatively slipping surfaces of drive connector plate 314 and hub carrier 328.

An annular O-ring seal 346 is positioned in a slot formed in the inner surface of connector plate 314 and engages the cylindrical end 348 of hub carrier 310. Seal 346 aids in preventing water from entering the interior of hub 208 when the shear pin 312 breaks and hub carrier 310 revolves relative to drive connector plate 314. A nut 350 is threadedly secured to the threaded shank 352 extending from the drive shaft portion 322. The nut maintains the hub 208 on the drive shaft 12.

For the purpose of watertightness, an annular seal 354 is non-rotating and is positioned in an offset 356 formed at the inner edge of closure plate 72. The seal 354 has a pair of annular legs 358 and 360 engaging the drive shaft 12 for preventing water from entering the hub 208 and for preventing lubricant from leaving the interior of the propeller 10.

The design and construction of the parts of the hub and controllable pitch propeller provide that the interior of the hub can be lubricated from the single lubricant inlet 370 formed in hub 208. A releasable threaded nut 372 closes the inlet 370 and can be removed for injection of a lubricant such as grease or oil. The lubricant flows from inlet 370 through duct 374 into annular space 375, forming a part of the central bore in hub 208, to lubricate the racks 34 and 36 and the pinions 38 and 44 which they engage.

The lubricant flows through a duct 376 to lubricate the roller bearings 250. Similarly, the lubricant flows through duct 377 to lubricate the roller bearings 258. The lubricant flows through passage 378, located between plate 182 and hub portion 380, to lubricate the seal 180, the ball bearing assembly 272 and the seal 286. Further, the lubricant flows between the sleeve 174 and the cylindrical actuator portion 218 to reach and lubricate the ball bearing assembly 200. Also, the lubricant passes around the end 220 of actuator 32, through passage 382, between closure flange 74 and hub carrier end 326, to the annular space 384 between flange 74 and drive shaft 12, whereby the seals 324 and 354 are lubricated.

Referring to FIG. 1, the outboard motor is secured by a clamp 400 to the stern 402 of the boat 250. A conventional engine is contained in housing 404 and is started by a knob 406. Steering is accomplished by handle 408.

The diagrammatically-illustrated hydraulic control system 16 includes a pair of cylinders 410 and 412 connected, respectively, to lines 18 and 20. A hydraulic piston 414 is slidably received in cylinder 410 and has an O-ring 416 positioned in its grooved edge and engaging the inner surface of cylinder 410. A spindle 418 connects the piston 414 to a rack 420 engaging gear 422.

Similarly, a hydraulic piston 424 is slidably received in hydraulic cylinder 412 and has an O-ring 425 positioned in a groove in its edge and sealingly engaging the inner surface of cylinder 412. A spindle 426 extends from piston 424 to rack 428 also meshing with gear 422. A manually-operable handle 430 is rigidly secured to the shaft upon which gear 422 is keyed. An oil reservoir is diagrammatically indicated at 432 and has tubes 434 and 436 communicating with spaced positions in the cylinder 410. Similarly, tubes 438 and 440 extend from reservoir 432 and open into cylinder 412 at spaced positions. The elements of the mechanism are so dimensioned that a full stroke of hydraulic pistons 414 and 424 causes a change in the pitch of propeller blades 42 and 48 from maximum ahead pitch to maximum reverse pitch.

The operation of the controllable pitch propeller 10 previously described will now be explained. The engine 14 is started in a conventional manner. By rotating the handle 430 to actuate the pistons 414 and 424, oil under pressure is supplied to either side of the hydraulic piston 30. To move the propeller blades 42 and 48 to the maximum ahead position shown in FIG. 2, oil is supplied through line 18, duct 98, pipe 102 to the inboard portion of hydraulic space 78 to move piston 30 and actuator 32 to the position shown in FIG. 2. To change the pitch of the blades 42 and 48, handle 430 is rotated clockwise as seen in FIG. 1 to force oil through line 20, duct 106, bore 104, hole 110, ducts 112, 114, and 116, to press against the outboard surface 118 of the hydraulic cylinder 30. The hydraulic cylinder is moved to the left as viewed in FIG. 2. The seals 140 and 142 prevent loss of pressure on the outboard surface 118. The actuator 32 is revolving in unison with the hub 208 and blades 42 and 48. As the piston 30 moves to the left, as viewed in FIG. 2, the revolving actuator 32 is also moved to the left, being driven by the thrust bearing assembly 200. It will be seen that the seals 140 and 142 need not be revolved and are, thus, given greater durability because of reduced wear. Further, the ball bearing assembly 200 provides a driving connection between the relatively revolving actuator 32 and piston 30 with reduced friction. As the actuator 32 moves to the left, the racks 34 and 36 engage and rotate the pinions 38 and 44. Thus, the blades 42 and 48 are rotated to a lesser ahead pitch, neutral or reverse pitch.

If either blade 42 or 48 strikes a rock, the shear pin 312 fails and damage to the elements of the mechanism is prevented. A new shear pin is placed in position as previously described and operation resumed.

The design of the controllable pitch propeller provides that low operating hydraulic pressure is required. After the pitch of the blades 42 and 48 is set to a desired position, no further actuation of control system 16 is necessary to maintain the blades at the desired pitch. The hydraulic lock produced by the oil on both ends of piston 30 aids in maintaining the blades at the set position. Thrust on bearing assembly 200 is reduced by the inventive construction.

Wear on bearings seals is reduced by the construction of the invention. Only the seals 354 and 286 are subject to rotational wearing.

The invention thus provides a fluid-actuated mechanical movement having reduced wear and increased durability.

The invention thus also provides a controllable pitch propeller constructed for reduced friction, durability, and ready and convenient operation to achieve various pitches. The propeller of the invention is designed for convenient lubrication from a single lubricant inlet. Further, the propeller of the invention prevents damage to the mechanism by providing a frangible element that fails when the blades strike an obstruction and permits free rotation of the drive shaft.

While a present preferred embodiment of the invention has been illustrated and described, it will be recognized that the invention may be otherwise variously embodied and practiced within the scope of the following claims.

I claim:

1. A controllable pitch propeller comprising a revolvable hub; a plurality of propeller blades rotatably mounted in said hub and extending therefrom; anti-friction bearings positioned between each said propeller blade and said hub; a closure member positioned inboard of said hub, said closure member having a pair of annular flanges extending therefrom and forming an annular fluid chamber between said flanges, said hub having an end portion extending around the periphery of the outer said flange; an anti-friction bearing assembly between said hub end portion and the outer said flange for providing revolution of said hub around said flange; a fluid piston positioned within said fluid chamber for reciprocation therein; an actuator having one end connected to said fluid piston by an anti-friction thrust bearing so that said actuator reciprocates unitarily with said fluid piston but said actuator revolves relative to said piston; means connecting said actuator to said propeller blades for producing rotation of said blades on their respective axes in response to reciprocation of said actuator; a lubricant inlet formed in said hub; passageways connecting said inlet to said propeller blade bearings; a passageway connecting said lubricant inlet with said hub-end bearing assembly; a passageway connecting said lubricant inlet with said thrust bearing assembly; whereby the injection of lubricant into said lubricant inlet will supply lubricant to the aforesaid bearing assemblies.

2. A controllable pitch propeller as set forth in claim 1 and including a watertight seal between said hub end and said outer flange; said closure member being undercut adjacent its axial bore to form an offset and a shoulder; a seal positioned in said offset and abutting against said shoulder for forming a watertight seal with a drive shaft.

3. A controllable pitch propeller assembly for attachment to the drive shaft of an outboard marine motor, said propeller comprising a revolvable hub with an axial bore extending therethrough; a plurality of propeller blades each rotatably mounted in said hub and extending outwardly therefrom; a pinion secured to the inner end of each said propeller blade; anti-friction bearings positioned between each said propeller blade and said hub; a hydraulic control block mounted adjacent said hub, said control block having a bore formed therein coaxially with the bore in said hub for receiving the drive shaft of an outboard marine motor, said control block comprising a radial closure plate and an inner cylindrical flange and an outer cylindrical flange extending axially from radially-spaced positions on said radial closure plate, said inner cylindrical flange and said outer cylindrical flange forming an annular hydraulic chamber therebetween; an annular hydraulic piston reciprocably positioned in said annular chamber; an actuator having its inboard end connected by a thrust ball bearing assembly to said hydraulic piston; racks secured to the outboard end of said actuator and engaging said pinions on said propeller blades; said hydraulic piston having a sleeve portion extending around the inboard end of said actuator; said control block including an annular plate forming the outboard end of said hydraulic chamber; a seal ring mounted on the inner surface of said annular plate and engaging said sleeve; said control block including a hydraulic inlet with two ducts, said control block having passages formed therein for directing hydraulic fluid from each said duct to opposite ends of said annular chamber; a hydraulic supply system including a pair of hydraulic cylinders, lines connecting each said hydraulic cylinder to one of said ducts in said hydraulic inlet, supply pistons positioned in said hydraulic cylinders, and manually-operable means for synchronously moving said supply pistons in said cylinders; a ball bearing assembly between the inboard end of said hub and said outer cylindrical control block flange; a seal between said inboard end of said hub and said outer cylindrical control block flange, said seal being located inboard from said last-mentioned ball bearing assembly; a hub carrier positioned within said actuator, said hub carrier having an axial bore extending therethrough for receiving a drive shaft, said hub carrier including means for forming a driving connection between said hub carrier and a drive shaft, said hub carrier including a disk-shaped flange portion at the outboard end of said hub; a drive connector plate positioned adjacent said hub carrier flange portion; a shear pin forming a frangible driving connector between said drive connector plate and said hub carrier flange portion; a gasket between said drive connector plate and said hub carrier flange portion; said hub having a lubricant inlet formed therein and extending to the bore of said hub; and, ducts and passageways for delivering lubricant from said hub to said bearings and seals.

4. In a controllable pitch propeller assembly for attachment to a marine drive shaft, the combination of a control block having a bore extending therethrough for receiving the drive shaft, said control block being non-rotatable around the drive shaft and having an annular fluid chamber formed therein surrounding said bore; an annular piston positioned in said fluid chamber and having fluid-sealed contact with the inner and outer surfaces of said fluid chamber for preventing fluid flow between the opposite ends of said piston, said piston being rotatable and reciprocable relative to said control block; means for selectively delivering fluid under pressure to said fluid chamber at one end thereof; means for selectively delivering fluid under pressure to the opposite end of said chamber; a revolvable hub having a bore formed therein for receiving said drive shaft; a plurality of marine propeller blades rotatably mounted in said hub and extending therefrom; an actuator having a generally annular shape and reciprocable unitarily with said piston and rotatable realtive to said piston; means connectnig said actuator to said propeller blades so that reciprocation of said actuator causes rotation of said propeller blades around their respective axes; anti-friction means connecting said piston and said actuator for permitting said rotation of said actuator relative to said piston, said anti-friction means providing a driving connection between said actuator and said piston for producing said unitary reciprocation of said actuator and said piston.

5. In a controllable pitch propeller assembly for attachment to a marine drive shaft, said assembly including a revolvable hub, a plurality of marine propeller blades rotatably mounted in said hub and extending therefrom, and means for rotating said propeller blades about their axes to change the pitch of the blades; the improvement wherein said pitch changing means includes a control block mounted adjacent said hub and having a bore extending therethrough for receiving the drive shaft, said control block being non-rotatable around the drive shaft and having an annular fluid chamber formed therein surrounding said bore, an annular piston positioned in said fluid chamber and having fluid-sealed contact with the inner and outer surfaces of said fluid chamber for preventing fluid flow between the opposite ends of said piston, said piston being rotatable and reciprocable relative to said control block, means for selectively delivering fluid under pressure to said fluid chamber to exert pressure on one end of said piston, means for selectively delivering fluid under pressure to said fluid chamber to exert pressure on the other end of said piston, an actuator having a generally annular shape and reciprocable unitarily with said piston and rotatable relative to said piston, anti-friction means connecting said piston and said actuator for permitting said rotation of said actuator relatve to said piston, said anti-friction means providing a driving connection between said actuator and said piston for producing said unitary reciprocation of said actuator and said piston, means connecting said actuator to said propeller blades so that upon said reciprocation of said actuator a rotation of said blades about their axes is produced, said piston including a sleeve of annular shape extending around said actuator, and, fluid-tight seal means between said control block and said sleeve.

6. The invention as set forth in claim 5 and including a ball bearing assembly supporting said hub on said control block and a water-tight seal between said hub and said control block.

7. The invention as set forth in claim 6 and including a snap ring seated in said control block and abutting said ball bearing assembly.

8. The invention as set forth in claim 5 wherein said control block includes a fitting with a pair of branches for the passage of hydraulic fluid, one of said branches communicating with one end of said fluid chamber and the other of said branches communicating with the opposite end of said fluid chamber.

9. For attachment to the drive shaft of a marine engine, a controllable pitch propeller assembly comprising a control block having a bore extending therethrough for receiving the drive shaft, said control block having an annular fluid chamber therein around said bore; a hub revolvable around said control block; a water-tight seal between said revolvable hub and said control block; said control block including an end plate extending partially across one end of said fluid chamber; a piston in said chamber, said piston being slidably reciprocable along the length of said chamber and rotatable relative to said control block around the axis of said bore; means for selectively delivering fluid under pressure to the portion of said fluid chamber bounded by said plate to exert pressure on one end of said piston; means for selectively delivering fluid under pressure to said fluid chamber at the opposite end thereof to exert pressure on the other end of said piston; an actuator reciprocable unitarily with said piston and rotatable relative to said piston, said actuator being generally annular in shape; anti-friction means connecting said piston and said actuator for permitting said rotation of said actuator relative to said piston, said anti-friction means providing a driving connection between said actuator and said piston for producing said unitary reciprocation of said actuator and said piston; said piston including a sleeve of annular shape extending adjacent the inner edge of said plate and surrounding said actuator; and seal means between the inner edge of said plate and said sleeve for maintaining the fluid pressure within said fluid chamber.

10. The invention as set forth in claim 9 wherein said control block is restrained from rotation around the axis of the drive shaft and including a bearing between said control block and said hub for supporting said hub revolvably on said control block, and including a hub carrier for driving connection with the drive shaft, said hub carrier being positioned within said actuator, said hub carrier having a flange at the outboard end of said hub, said actuator being dimensioned so that said actuator strikes said flange before said piston encounters said control block at the end of the outward stroke of the piston.

11. A controllable pitch propeller for attachment to a drive shaft of a marine power plant, said controllable pitch propeller comprising a hub having an axial bore extending therethrough; a plurality of propeller blades projecting from said hub; a hub carrier positioned within said bore of said hub, said hub carrier having an axial bore extending therethrough for receiving a drive shaft, said hub carrier including means for forming a driving connection between said hub carrier and a drive shaft, said hub carrier including a flange; a connector plate adjacent said flange; means connecting said connector plate to said hub for unitary revolving therewith; said connector plate having a plurality of circumferentially-spaced openings formed therein, said hub carrier flange having a cavity formed therein capable of registering with any of said openings in said connector plate; a shear pin of frangible material positioned in said cavity and having a portion positioned in one of said openings; and a compression spring within said cavity behind said shear pin for ejecting the portion of said shear pin remaining in said cavity after shearing when a propeller blade strikes an object.

12. Apparatus for transmitting drive comprising a control block having a bore extending therethrough for receiving a drive shaft, said control block having an annular fluid chamber formed therein surrounding said bore; an annular piston positioned in said fluid chamber and having fluid-sealed contact with the inner and outer surfaces of said fluid chamber for preventing fluid flow between the opposite ends of said piston, said piston being rotatable and reciprocable relative to said control block; means for delivering fluid under pressure to said fluid chamber to move said piston axially in said chamber; a revolvable member having a bore formed therein for receiving said drive shaft, said revolvable member being adapted to be revolved by said drive shaft; adjustable means on said revolvable member; an actuator connected to adjust said adjustable means, said actuator also being connected to reciprocate unitarily with said piston and rotate relative to said piston; whereby reciprocation of said piston causes adjustment of said adjustable means.

13. Apparatus for transmitting motion comprising a control block having a bore extending therethrough for receiving a drive shaft, said control block being non-rotatable around the drive shaft and having an annular fluid chamber formed therein surrounding said bore; an annular piston positioned in said fluid chamber and having fluid-sealed contact with the inner and outer surfaces of said fluid chamber for preventing fluid flow between the opposite ends of said piston, said piston being rotatable and reciprocable relative to said control block; means for selectively delivering fluid under pressure to said fluid chamber to exert pressure on one end of said piston; means for selectively delivering fluid under pressure to said fluid chamber to exert pressure on the other end of said piston; a revolvable hub having a bore formed therein for receiving said drive shaft, means for forming a driving connection between said drive shaft and said hub; rotatably-adjustable means mounted on said hub for revolving as one with said hub; an actuator having a generally-annular shape and being connected to rotate said rotatably-adjustable means, said actuator revolving as one with said hub and also being connected to reciprocate unitarily with said piston and rotate relative to said piston; whereby, reciprocation of said piston causes the revolving actuator to reciprocate and cause adjustment of said adjustable means.

14. Apparatus for transmitting motion comprising a control block having a bore extending therethrough; a drive shaft rotatably received in said bore, said control block having an annular fluid chamber formed therein surrounding said bore; an annular piston positioned in said fluid chamber and having fluid-sealed contact with the inner and outer surfaces of said fluid chamber for preventing fluid flow between the opposite ends of said piston, said piston being rotatable and reciprocable relative to said control block, said piston being normally non-rotating with respect to said control block; means for selectively delivering fluid under pressure to said fluid chamber to exert pressure on either end of said piston; a revolvable hub having a bore formed therein receiving said drive shaft; means forming a driving connection between said drive shaft and said hub so that said hub and said drive shaft revolve as one; means locating said drive shaft axially with respect to said control block and said hub so as substantially to prevent axial movement of said drive shaft relative to said control block and said hub; rotatably-adjustable means mounted on said hub for revolving as one with said hub; an actuator having a generally-annular shape and being connected to rotate said rotatably-adjustable means, said actuator revolving as one with said hub and also being connected to reciprocate unitarily with said piston and rotate relative to said piston; whereby reciprocation of said piston causes the revolving actuator to reciprocate and cause adjustment of said adjustable means.

References Cited in the file of this patent

UNITED STATES PATENTS

| | | |
|---|---|---|
| 227,319 | Tegnander | May 4, 1880 |
| 1,384,672 | Murray | July 12, 1921 |
| 2,353,773 | Unterberg | July 18, 1944 |
| 2,536,546 | Hatcher | Jan. 2, 1951 |
| 2,554,611 | Biermann | May 29, 1951 |
| 2,850,106 | Swan | Sept. 2, 1958 |
| 2,949,313 | Moser et al. | Aug. 16, 1960 |